(12) United States Patent
Mohebbi

(10) Patent No.: US 8,478,191 B2
(45) Date of Patent: Jul. 2, 2013

(54) SHORT RANGE BOOSTER WITH MULTIPLE ANTENNAS

(75) Inventor: Behzad B. Mohebbi, San Diego, CA (US)

(73) Assignee: Nextivity, Inc., San Diego, CA (US)

( * ) Notice: Subject to any disclaimer, the term of this patent is extended or adjusted under 35 U.S.C. 154(b) by 1176 days.

(21) Appl. No.: 12/131,839

(22) Filed: Jun. 2, 2008

(65) Prior Publication Data

US 2008/0299896 A1 Dec. 4, 2008

Related U.S. Application Data

(60) Provisional application No. 60/932,677, filed on Jun. 1, 2007.

(51) Int. Cl.
*H04B 3/36* (2006.01)
*H04B 7/14* (2006.01)

(52) U.S. Cl.
USPC ............. 455/8; 455/11.1; 455/13.1; 370/315; 370/279; 370/252

(58) Field of Classification Search
USPC ................. 370/315, 210, 279, 322, 328, 316, 370/252, 280; 455/23, 11.1, 8, 509, 7, 24, 455/12.1, 13.1, 422.1, 13.4, 16
See application file for complete search history.

(56) References Cited

U.S. PATENT DOCUMENTS

| | | | | |
|---|---|---|---|---|
| 5,065,449 A | * | 11/1991 | Gordon et al. | 455/15 |
| 5,168,574 A | | 12/1992 | Gordon et al. | |
| 6,125,109 A | * | 9/2000 | Fuerter | 370/315 |
| 6,678,508 B1 | * | 1/2004 | Koilpillai et al. | 455/137 |
| 6,763,077 B1 | * | 7/2004 | Saito et al. | 375/349 |
| 7,519,323 B2 | * | 4/2009 | Mohebbi | 455/11.1 |
| 7,606,531 B2 | * | 10/2009 | Asai et al. | 455/11.1 |
| 8,081,585 B2 | * | 12/2011 | Mohebbi | 370/279 |
| 8,086,174 B2 | * | 12/2011 | Mohebbi | 455/11.1 |
| 2009/0215390 A1 | * | 8/2009 | Ku et al. | 455/23 |
| 2009/0239521 A1 | * | 9/2009 | Mohebbi | 455/422.1 |
| 2010/0157876 A1 | * | 6/2010 | Song et al. | 370/315 |
| 2011/0267976 A1 | * | 11/2011 | Oodachi et al. | 370/252 |

FOREIGN PATENT DOCUMENTS

| | | |
|---|---|---|
| EP | 0430481 | 6/1991 |
| EP | 0556010 | 8/1993 |
| EP | 0668662 | 8/1995 |

(Continued)

OTHER PUBLICATIONS

Kanakis et al., "Relaying MIMO channel capacity with imperfect channel knowledge at the receiver", Mobile WiMax Symposium, 2007. IEEE, IEEE, PI, Mar. 1, 2007, pp. 80-84.

(Continued)

*Primary Examiner* — Sujatha Sharma
(74) *Attorney, Agent, or Firm* — Mintz Levin Cohn Ferris Glovsky and Popeo, P.C.

(57) ABSTRACT

Systems, methods and techniques for operating a wireless repeater with multiple antennas are presented. Signals from a wireless communication device are received by a wireless repeater on at least two branch channels associated with at least two repeater receiver antennas. Path or space diversity is resolved from the signals, and the signals are processed on the at least two branch channels to produce at least one strong signal to be repeated to another wireless communication device.

20 Claims, 11 Drawing Sheets

FOREIGN PATENT DOCUMENTS

| | | |
|---|---|---|
| EP | 1318641 | 6/2003 |
| EP | 1641167 | 3/2006 |
| GB | 2382276 | 5/2003 |
| WO | 01/78255 | 10/2001 |
| WO | 02/11301 | 2/2002 |
| WO | 2004/049595 | 6/2004 |
| WO | 2005/025078 | 3/2005 |
| WO | 2007/035550 | 3/2007 |

OTHER PUBLICATIONS

PCT Notification of Transmittal of the International Search Report and the Written Opinion of the International Searching Authority, or the Declaration, dated Aug. 14, 2009, in connection with counterpart PCT application No. PCT/US2008/007026.

* cited by examiner

//  SHORT RANGE BOOSTER WITH MULTIPLE ANTENNAS

CROSS REFERENCE TO RELATED APPLICATIONS

This application claims the benefit under 35 U.S.C. Section 119(e) of a provisional application U.S. Ser. No. 60/932,677, entitled "SHORT RANGE BOOSTER WITH MULTIPLE ANTENNAS," filed Jun. 1, 2007, which is incorporated by reference herein.

BACKGROUND

As the cellular and wireless communications become more prevalent, new applications and terminals are designed to meet the growing demand of the market. The new 2.5G and 3G cellular systems such as GSM/EDGE/GPRS, WCDMA, TD-SCDMA and cdma2000 and 4G systems such as WiMax support a variety of data rates and applications. Apart from voice, new high data-rate applications such as video streaming and internet browsing are also supported by these systems. The support of data applications by such systems has lead to a variety of new terminals such as the PDAs and laptops with data cards or embedded cellular modems.

These new terminal types do not conform to a handset size and are not limited to handset power consumption, nor do they conform to the use case scenarios considered for handheld voice terminals. Therefore, a growing number of data cards and embedded modems are using well-known techniques such Antenna Space Diversity (ASD) in the receivers to improve the link performance. Further, more advanced multiple antenna techniques such as Transmit-Diversity (TD) and Multiple-Input Multiple-Output (MIMO) schemes are specified at the outset of the system design for the emerging 4G cellular systems, enabling these new systems to surpass the link speed and quality of the 3G systems. These new space-time diversity techniques provide gains in excess of 10 dB in the link-budget, improving data rates, indoor and outdoor Probability of Coverage (PoC) and the cell range and robustness.

Although these highly beneficial multiple antenna techniques (ASD, TD & MIMO) are being gradually introduced in the cellular systems, the current repeater architecture that employ a single receiver and a single transmitter antenna, often with some degree of directivity, cannot support communications using multiple antennas, diminishing the gain possible with such techniques.

FIG. 1 shows an ASD enabled Mobile Station (MS) in communications with the Base Transceiver Station (BTS) via a conventional repeater. The BTS does not use any Transmit Diversity (TD) scheme in this example. Although the link is bidirectional, only the downlink example is considered here for convenience. Even though the uplink may have different behavior than the downlink, the downlink discussions are also valid for the uplink of the system.

On the downlink, the MS antenna diversity will provide two signals with two different Signal-to-Noise Ratios (SNRs) to the diversity algorithm of the terminal unit. These two signals can then be combined by well known algorithms such Maximal-Ratio Combining (MRC) or Equal-Gain Combining (EGC) or other algorithms such as Selection Combining (SC) or Switched Combining (SWC). In either case, in average, a better final SNR is provided by the diversity scheme above the average SNR possible with a single antenna receiver.

The SNR improvement with diversity antennas is realized by combining or selecting signals received by the MS antennas (Ant 1 and 2). If the MS received signals were directly from the BTS, the only additive noise entering each antenna would have been $N_{ir1}$ and $N_{ir2}$ respectively. So each branch SNR will then be the ratio of the received signal ($S_{ir}$) power to the noise power ($N_{ir}$). However, in the case where the MS received signals are from a repeater, the repeater has already added a fixed and irreducible level of noise power ($N_r$) to the repeater transmitted signal ($S_o$), which is received by MS antennas. Therefore, regardless of the SNR gain of the space-diversity of the MS receiver, the single-antenna (i.e. no diversity) SNR of the repeater receiver sets the maximum performance limit achievable with the repeater in the link.

The repeater "original" received signal from BTS ($S_{io}$), enters the repeater antenna with a single SNR set by the additive thermal noise entering the receiver ($N_{io}$) and the effective repeater noise ($N_e$). As the repeater gain (G) is applied to the signal ($S_{io}$) and the repeater noise ($N_i+N_e$), repeater gain can NOT improve the "original" SNR of the single-antenna receiver. Therefore, the repeated signal ($S_o$), which is received by MS will at best have the repeater output SNR, which is worst than the repeater input SNR by the repeater Noise Figure (NF).

From the discussion above it is clear that a single antenna repeater can not provide the gain possible with the space-diversity at the mobile receiver. The loss of diversity gain is exacerbated by the directional antennas of the conventional repeaters, as the directionality of the antenna reduces or eliminates the multipath components of the received (or transmit) signal, further reducing the diversity gain at receiving end, be it at BTS or MS side.

SUMMARY

This document discloses a short range booster having multiple antennas. In one aspect, a multiple-input, multiple-output wireless communications repeater includes at least a first pair of antennas. Each antenna is configured to receive transmit branch signals transmitted from each transmit branch of a multiple-output wireless communication device. The repeater further includes a channel estimator dedicated for each of the transmit branches and connected with each of a number of receiver branch channels. Each channel estimator is configured to perform channel estimation on one of the transmit branch signals, and the output of each channel estimator for a given transmit branch is used to correct for impairment of the transmit branch signal associated with a receiver branch channel to produce a corrected transmit branch signal. The repeater further includes a combiner associated with each receiver branch channel, to combine the corrected transmit branch signal with other transmit branch signals from other receiver branch channels that have been corrected by their respective channel estimators for the same transmit branch.

In accordance with a further aspect, a method for repeating multiple-input wireless communications includes the steps of receiving a first transmit branch signal and a second transmit branch signal from a base transceiver station on each of a first pair of antennas. With a first pair of channel estimators, the method further includes the step of performing a channel estimation on each of the first transmit branch signal and second transmit branch signal received by a first antenna of the first pair of antennas, and with a second pair of channel estimators, performing a channel estimation on each of the first transmit branch signal and second transmit branch signal received by a second antenna of the first pair of antennas. The method further includes the step combining the signal received by a first antenna and second antenna of the first pair of antennas corrected by the channel estimation of the first transmit branch signal from the first pair of channel estimators and the second pair of channel estimators respectively, to produce a corrected first transmit branch signal. The method further includes the step of combining the signal received by a first antenna and second antenna of the first pair of antennas corrected by the channel estimation of the second transmit branch signal from the first pair of channel estimators and the second pair of channel estimators respectively, to produce a corrected second transmit branch signal.

In yet other aspects, a method for repeating multiple-input wireless communications includes selecting a best transmit signal from a plurality of signals received by multiple antennas of a set of first antennas, and transmitting, on a single antenna, the best transmit signal to a mobile station. A method of improving a base transceiver station signal for repeating to a mobile station is also presented, having the steps of acquiring a selected channel from a number of common channels used by the base transceiver station, receiving two or more branch signals from the base transceiver station, and estimating a channel impulse response based on the selected channel to produce an estimated channel impulse response for each of the received two or more branch signals. The method of improving a base transceiver station signal for repeating to a mobile station also includes combining the received two or more branch signals after correcting the received branch signal by a respective conjugate channel impulse response of each receiver branch, to produce a common signal for transmission to the mobile station.

Another method of improving a received signal before repeating the improved signal from a wireless repeater having at least two receiver diversity is disclosed. The method includes acquiring the relative phase difference of received branch signals by cross-correlating the received branch signals with each other, correcting for the phase difference between the received branch signals, and combining the two or more received branch signals to produce a common signal for transmission.

In yet another aspect, a method of improving a received signal before repeating the improved signal from a wireless repeater having at least two receiver diversity includes the steps of receiving signals on at least two branch channels associated with at least two repeater receiver antennas, determining a signal strength of each of the received signals, selecting the signal having a higher signal strength, and transmitting the signal having a higher signal strength on at least one server antenna.

In yet another aspect, a method of improving a received signal before repeating the improved signal from a wireless repeater having at least two receiver diversity is presented. The method includes the steps of receiving signals on at least two branch channels associated with at least two repeater receiver antennas, and delaying the signals on at least one branch channel to produce resolvable path diversity among the at least two branch channels. The method further includes the step of linearly combining the signals at a combiner to produce a combined signal.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
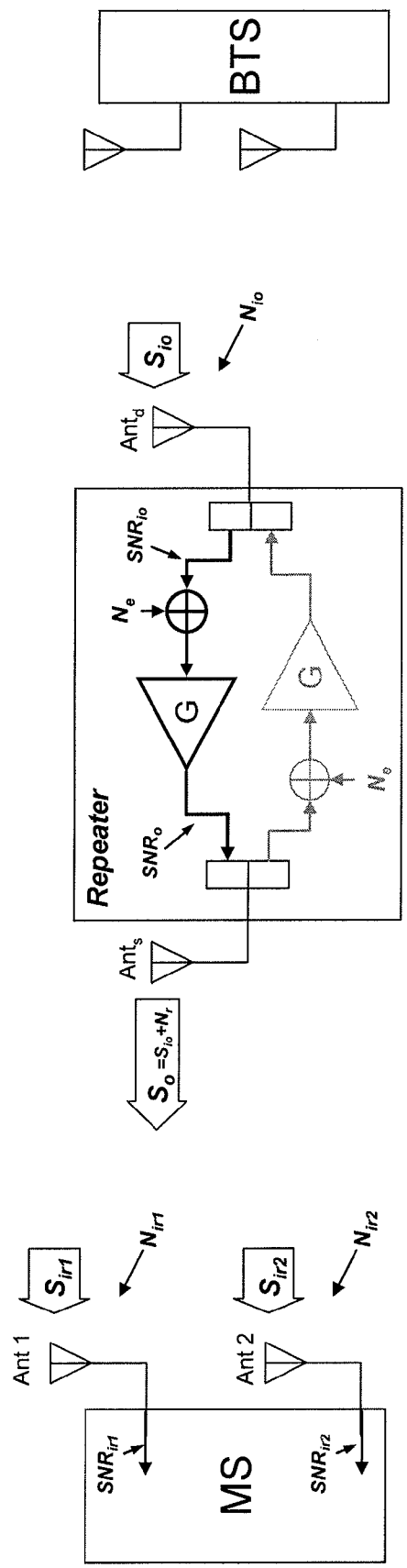
FIG. 1 shows an ASD enabled mobile station in communication with a Base Transceiver Station (BTS) via a conventional repeater.
Figure 2:
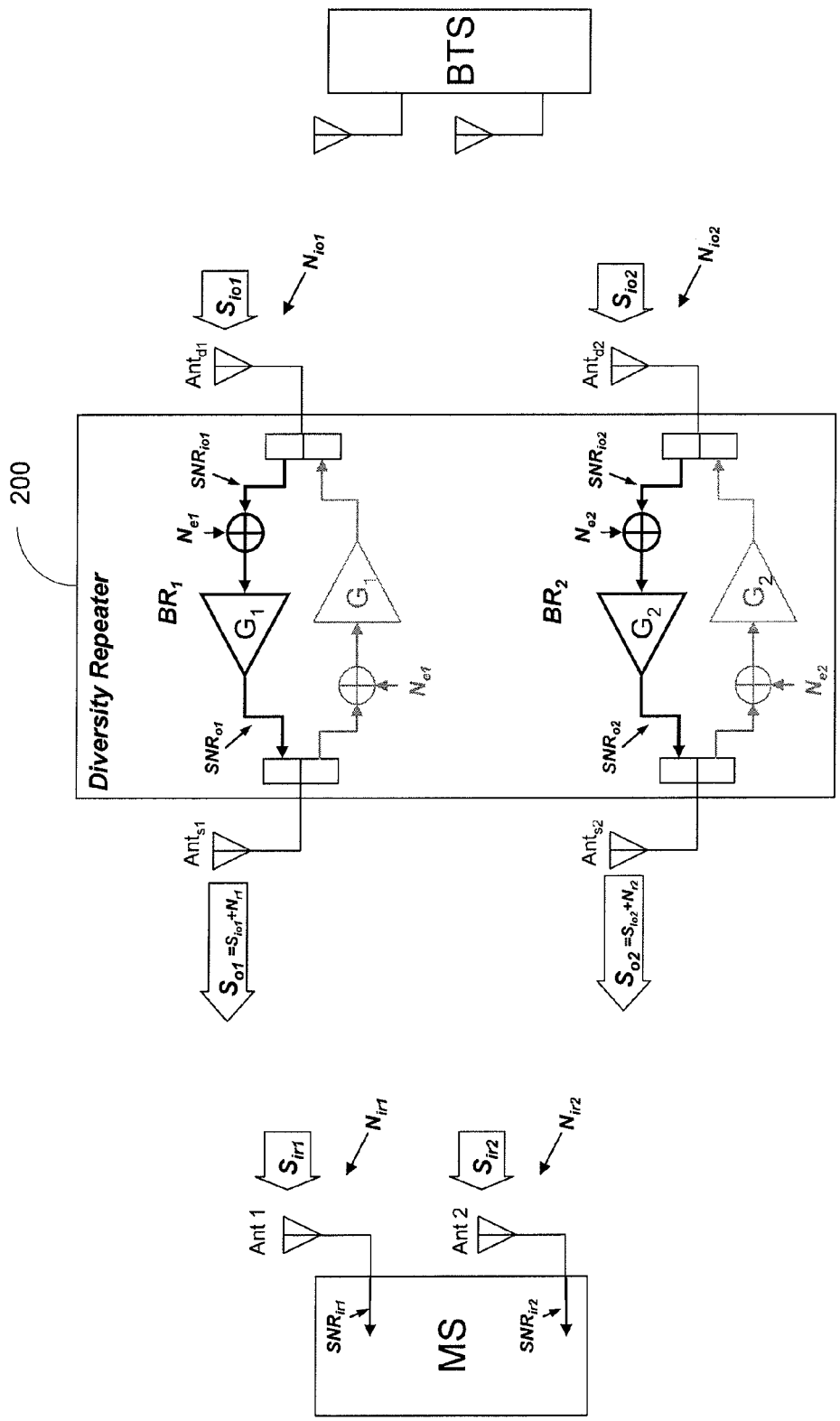
FIG. 2 shows an ASD enabled mobile station with diversity repeater.

This document describes multiple-input, multiple-output repeaters that provide diversity gain for a mobile station (MS) receiver. FIG. 2 shows a diversity repeater 200 that mediates signals between an MS and a base transceiver station (BTS). Two repeater donor antennas ($Ant_{d1}$ & $Ant_{d2}$) receive two different signals that have a high probability of having different SNRs. The SNRs of these two signals are preserved thorough the repeater chain, until their retransmission through repeater server antennas ($Ant_{s1}$ & $Ant_{s2}$). These two transmitted signals are then combined in "air" before arriving at the two MS receiver antennas ($Ant_1$ & $Ant_2$).

Although the two signals combine in the air (before entering the antennas), as long as the repeater transmitted signal with the lower SNR is attenuated sufficiently while the repeater transmitted signal with the higher SNR is received with adequate power, at least one of the two MS antennas will receive a high SNR signal, which later can be used to obtain some diversity gain. As the level of gain depends very much on the composition of the transmitted signals at the receiver antennas, the probability of diversity gain is now conditional and hence reduced compared to the gain possible without the repeater in the communication pathway. Nevertheless, this type of "diversity repeater" (shown in FIG. 2) does offer some diversity gain at a high cost, as there are now two repeaters required instead of one.

Figure 3:
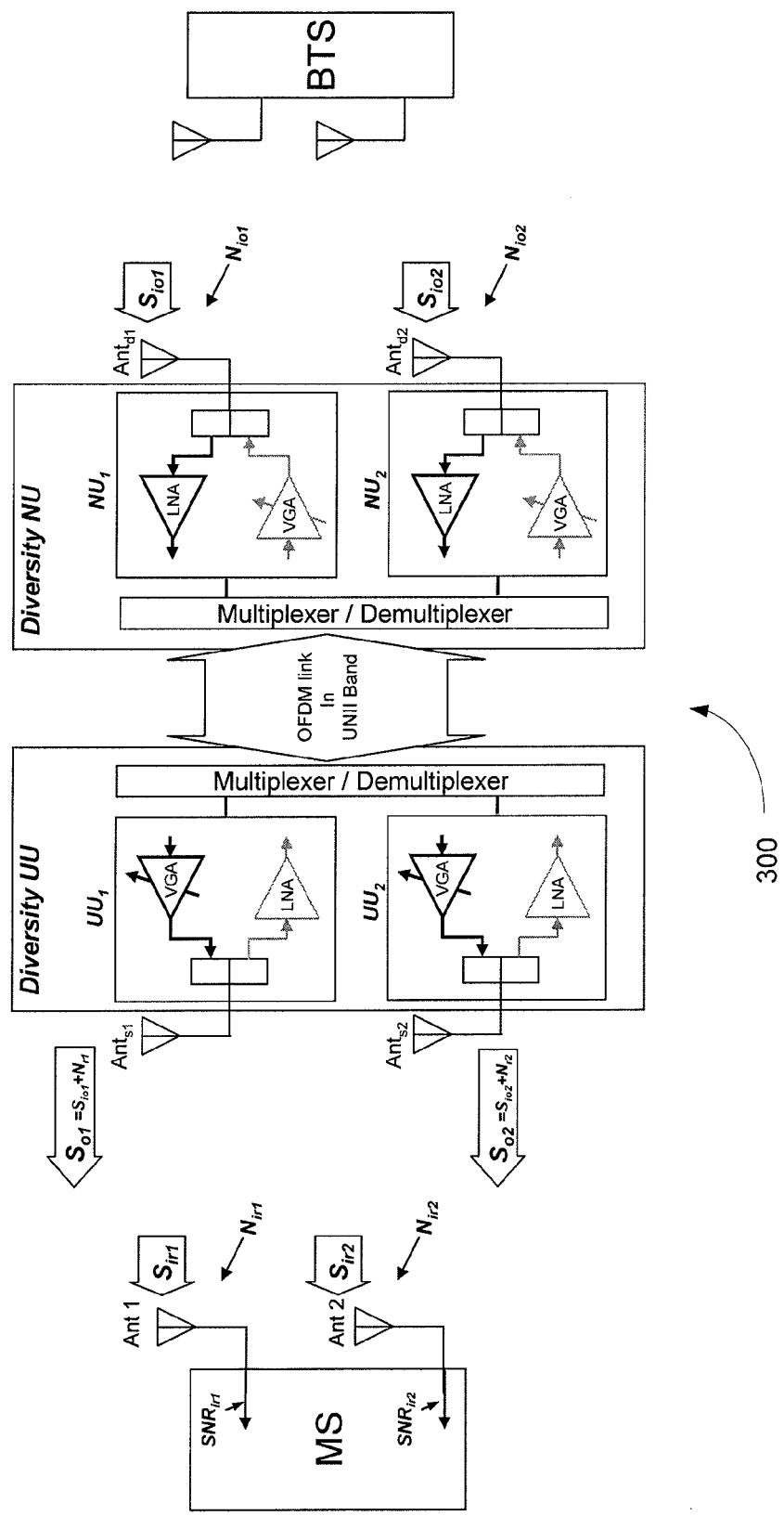
FIG. 3 shows an ASD enabled mobile station with diversity repeater with wireless link.

In a three-hop repeater such as is discussed in patent application WO2005025078 filed on Sep. 3, 2003 by Mohebbi, the contents of which are hereby incorporated by reference for all purposes, where there is a wireless link (OFDM in UNII band) between the receiver and the transmitter ends, each diversity branch data can be multiplexed on the same wireless link. FIG. 3 shows a three-hop repeater 300. Algorithms such as Selection Combining (SC) or Switched Combining (SWC) to reduce the repeater complexity can also be employed, as shown in diversity repeater 400 in FIG. 4. While the diversity repeater 400 shown in FIG. 4 may have lower complexity than the repeater 200 in FIG. 2, and may be perceived as inferior, it does not transmit the repeated signal with the lower SNR, which could otherwise constitute as interference at the mobile receiver.

Figure 5:
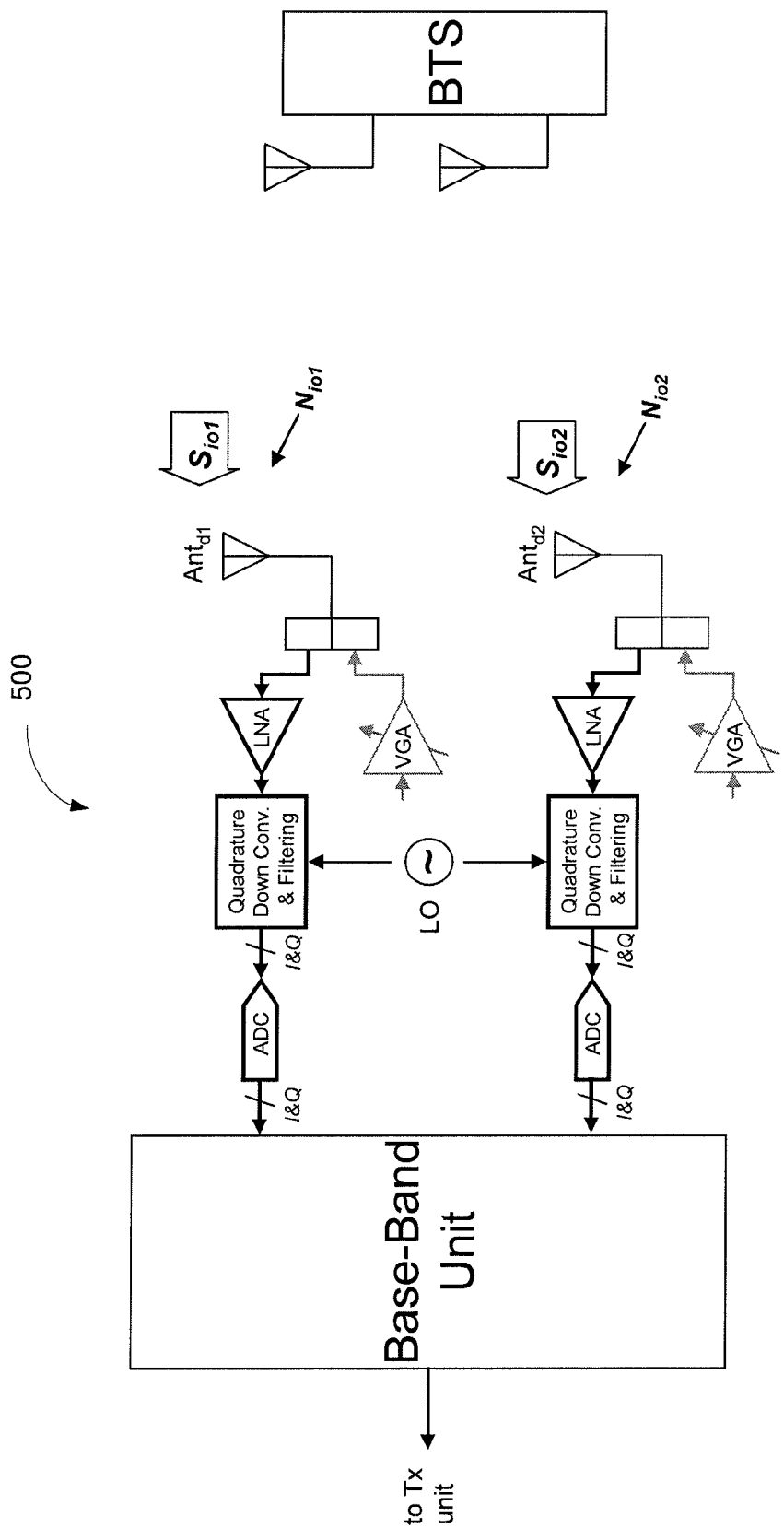
FIG. 5 shows a digital diversity repeater downlink receiver end.

With the emergence of digital repeaters (e.g. the repeater discussed in patent application WO2005025078), it is possible to economically introduce more advanced signal processing schemes in the repeater. In such digital repeaters, the input signal to a repeater is first down-converted to base-band and sampled for digital processing, where new and more advanced algorithms can be introduced either in dedicated processing units or on a general purpose processing engine. FIG. 5 shows an example of a downlink receiver-end 500 of a digital repeater with antenna space diversity.

Figure 6:
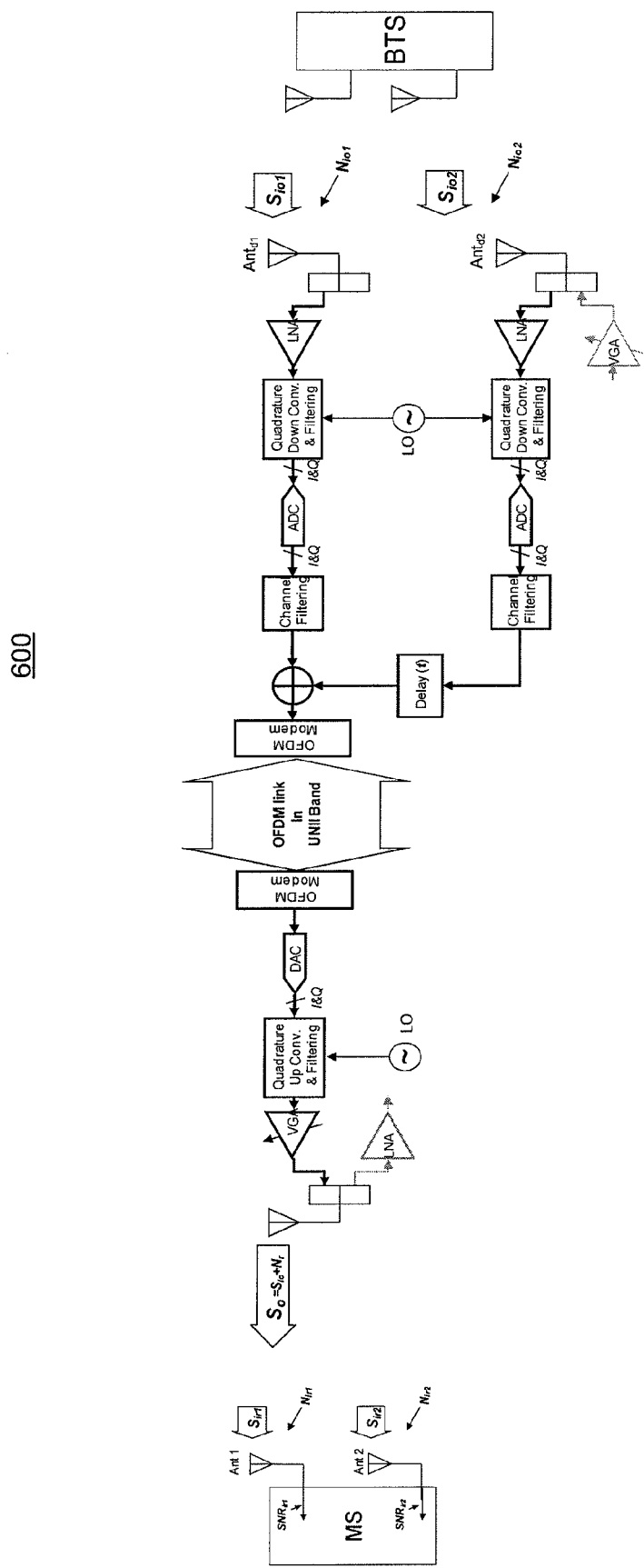
FIG. 6 shows a diversity repeater for combining path diversity.

FIG. 6 shows a diversity repeater 600 for combining "path-diversity." In this diversity repeater 600, the signals received on the diversity branches are delayed relative to each other, before linear combining of them (e.g. second branch in FIG. 6 is delayed by t seconds before combining with branch 1). The delay has to be sufficient to generate a resolvable path diversity that a handset (UE) receiver can combine with. For example, for WCDMA systems, this delay (t) is more than half a chip (1/3.84e6 sec) and less than 20 μsec. Cellular system that have RAISE receivers (such as WCDMA) and/or Equalizers (such as GSM) can directly benefit from path diversity. Systems that use OFDM as their modulation benefit indirectly as the delayed path will change the fading characteristic from a flat fading into a frequency selective one, providing some frequency diversity in the system. This scheme also has the added advantage that the data over the OFDM link in UNII band, as described in patent application WO2005025078, where there is a wireless link OFDM in UNII band between the two repeater units, will not be increased by the second branch as the data from the two branches are combined. Although FIG. 6 shows a wireless repeater, the same principle can be applied to conventional repeaters, or repeaters with wire connection.

Although it may be possible for some systems, such as GSM-based systems, to acquire the phase relationship between the diversity branches easily, it is more difficult for systems that use spread-spectrum modulation such as WCDMA and cdma2000. For example in WCDMA, the signal entering a repeater on the downlink, can be from several base stations with comparable powers. Also, the spread-spectrum nature of the signal makes it difficult to detect any phase or amplitude reliably in the presence of noise, and even harder in the presence of noise and interference. Further, these systems are usually wideband, operating in a time-dispersive channel, which makes a simple phase detection of the carrier frequency not suitable for a wideband combining.

Therefore for a system such as WCDMA, the repeater needs to acquire the BTS transmissions by way of acquiring one of the common control channels such as Primary Synchronization channel (P-SCH) or the Common Pilot Channel (CPICH). Once one of these channels is acquired (CPICH or P-SCH or S-SCH or any other common broadcast channel), it is then possible to estimate the channel impulse response (i.e. "channel estimates") of each of the diversity branches for a given BTS (usually the strongest). Where no single clear strong BTS can be detected, (i.e. in soft-handoff region), one of the BTSs can be chosen in random. It is also possible to detect several different BTS signals in parallel, and combined for maximum SNR for each of the different BTS separately, before recombining the combined signals from each BTS for the final transmission to the mobile.

Using the WCDMA example, "channel estimation" for each repeater receiver branch is required for a given BTS. Once the channel estimate for each branch is known ($h_1$ and $h_2$ in FIG. 7), a tap delay-line (or a chip-level equalizer) can be used to collect all the delayed energy in each branch, before the chip-level combining of the signal with MRC or EGC scheme. An example of such operation for two-branch diversity reception is shown in FIG. 7.

Figure 7:
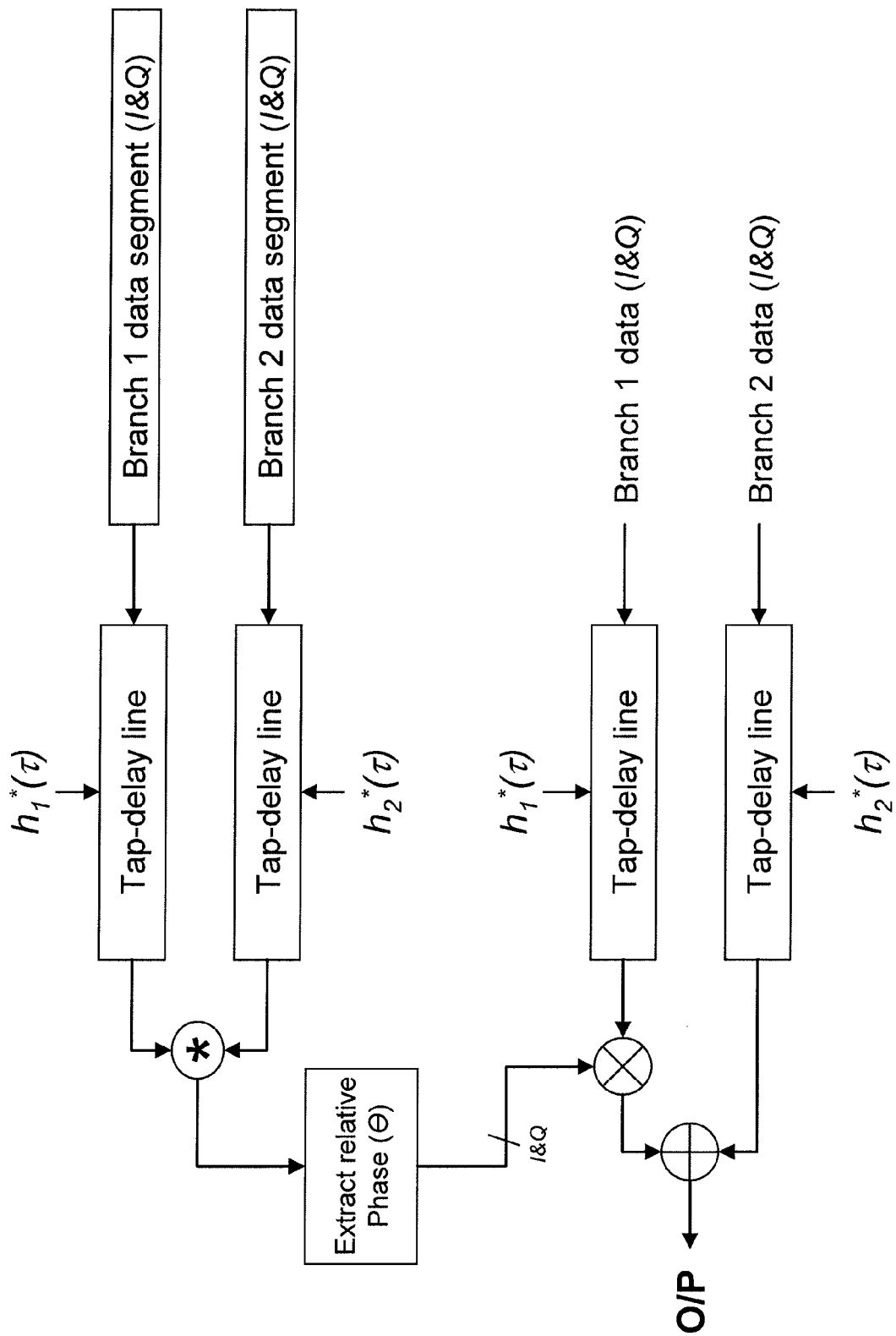
FIG. 7 shows a two-branch broadband diversity ECG scheme.
Figure 8:
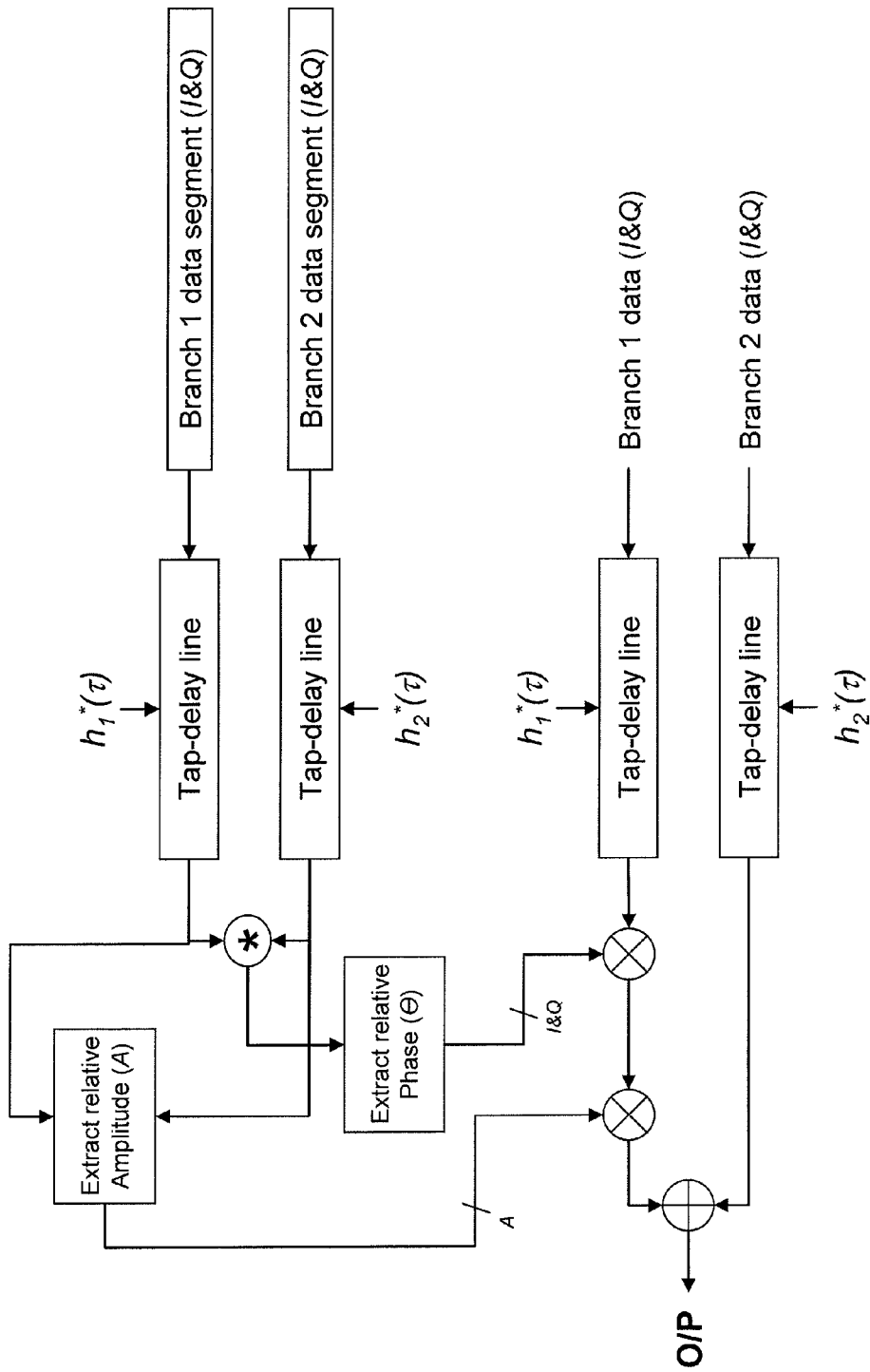
FIG. 8 shows a two-branch broadband diversity MRC scheme.
Figure 9:
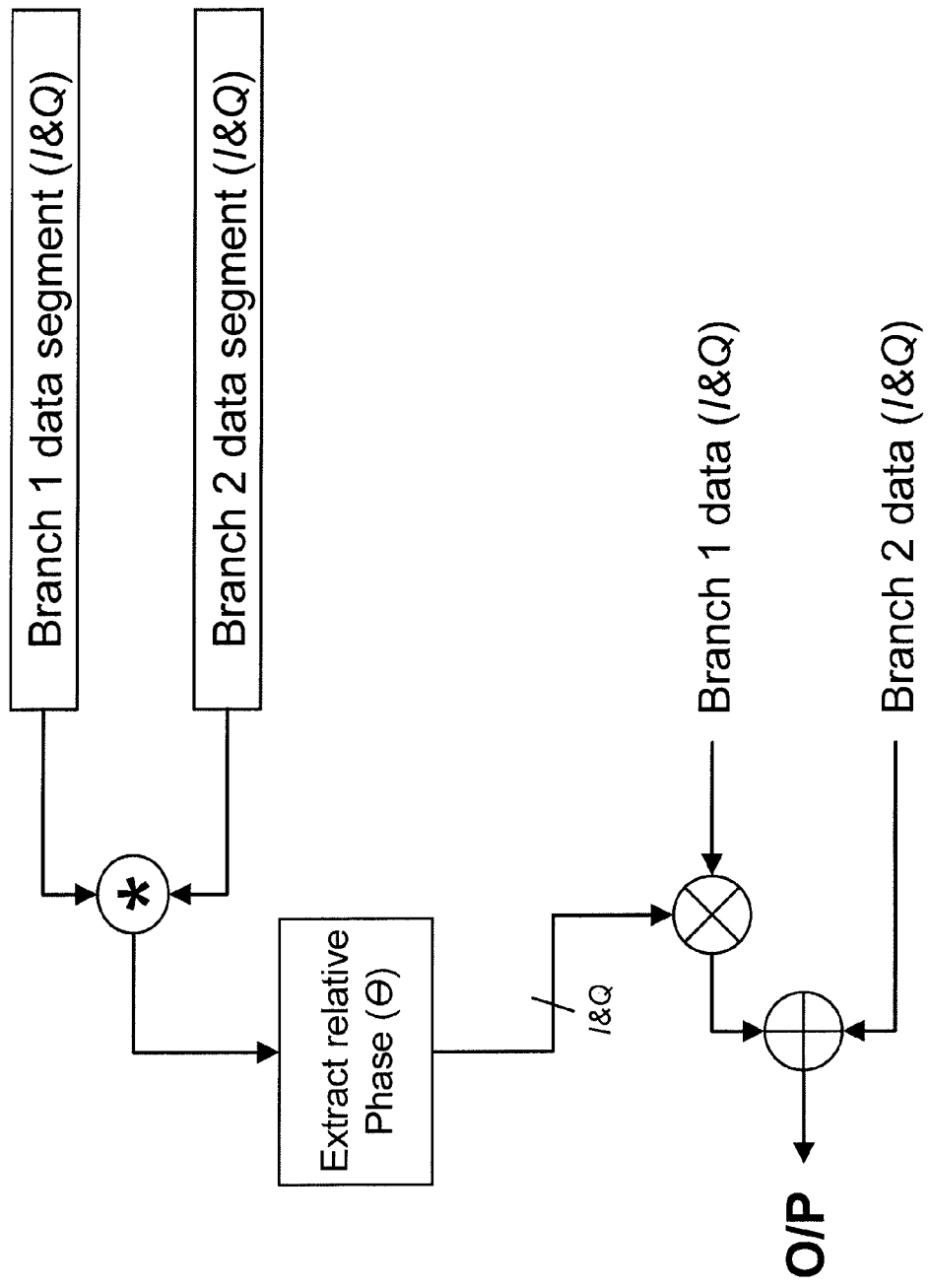
FIG. 9 shows a two-branch narrowband diversity ECG scheme.

FIG. 7 shows a two-branch broadband diversity arrangement 700, in which a segment of data from each branch is first passed through a tap-delay line with the tap coefficients set to the respective branch channel estimates conjugate ($h_1^*$ and $h_2^*$ in FIG. 7), before cross-correlation operation. The tap-delay lines will collect all the delayed energy in each branch and provide maximum SNR possible in each branch. The output of the Tap-delay lines are then cross-correlated to establish any residual phase difference remaining between the two branches. Once the relative phase information is established, the data from each branch is first passed through a tap-delay line with the tap coefficients set to the respective branch channel estimates conjugate ($h_1^*$ and $h_2^*$ in FIG. 7), before correcting for the residual phase difference and subsequent combining of the signals. The example above is for EGC. However by estimating the relative amplitudes or SNRs of the tap-delay line outputs before the correlator, it is possible to perform MRC combining as shown in a two-branch broadband diversity arrangement 800 illustrated in FIG. 8.

Where obtaining channel estimation is not possible and/or the time dispersion is not large (e.g. less than a chip duration in WCDMA systems), the combining scheme shown in FIG. 7 can be reduced to a two-branch narrowband diversity arrangement 900 as depicted in FIG. 9. The combining scheme shown in FIG. 9 can be used for example on the uplink of a WCDMA system with an indoor repeater where a single mobile (or several mobiles) is in an indoor environment with delay spread less than 200 nsec and with very slow channel movements (i.e. large coherence time ~50 msec). Small segments of the data (e.g. 100 chips) can be cross-correlated on an on-going basis, to establish the relative phases of the two (or any number of) branches.

Figure 10:
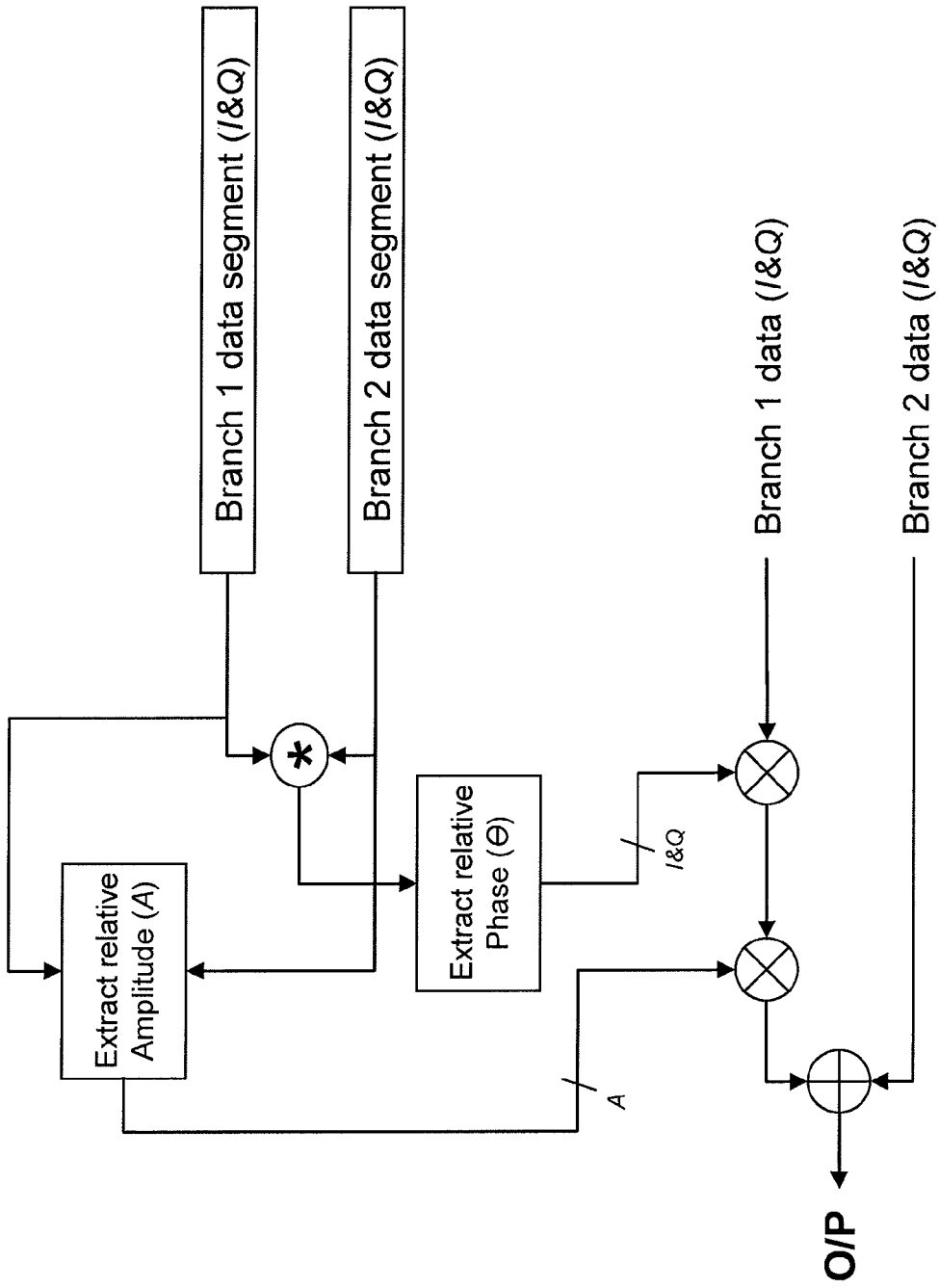
FIG. 10 shows a two-branch narrowband diversity MRC scheme.

This information can be used to combine the signal of the two receiver branches without knowing any other information about the signal and its content. MRC version of the scheme shown in FIG. 9 is shown in a two-branch narrowband diversity arrangement 1000 shown in FIG. 10. As before, the estimates of the relative amplitude or SNR can be used for MRC combining. The diversity combining schemes shown in FIGS. 9 and 10 can also be used on the downlink of the cellular system (in this example WCDMA), with some loss of performance compared to the broad-band versions shown in FIGS. 6 and 7 respectively.

For a repeater such as the one discussed in patent application WO2005025078, where an Automatic Gain Control (AGC) mechanism controls the output power of the repeater transmitted signal, care should be taken to measure the coupled signal level preferably after the combining algorithm, to include the combining effect on the coupled signals.

For OFDM based systems such as WiMax (and WCDMA LTE), the combining can either be carried out as discussed above in FIG. 5, 7, 8 or 9 on the received time domain signal, or in frequency domain on sub-carriers. The preamble (or the training sequence) of these systems can be used for time domain channel estimation. On the other hand, the frequency domain can be based on either the pre-amble (or the training sequence) in the frequency domain, and/or the inserted "pilot" sub-carriers. The time domain approach will exhibit less processing latency, while the frequency domain approach will have better performance in wide-band channels with frequency selective behavior, as the combining is performed at sub-carrier level.

Although the above discussion has been based on repeaters and systems with Antenna Diversity reception and combining with such algorithms as MRC, EGC, SC and SWC, with some modification the same novel schemes can be applied to MIMO repeaters and systems. MIMO systems usually use unique and different training sequences for each of the transmitter chain (Multiple outputs), which are also known to the receiver. The receiver, having all the required information about the transmitted training sequences (a priori), performs channel estimation for every transmitted sequences at all the receiver branches. Having the channel estimation at each branch for each transmit antenna, it can then use a combining scheme such as MRC or EGC to improve each transmit branch SNR at the receiver side. Each transmit branch can either transmit the same information, providing a very resilient link, or can transmit different data streams, providing higher data rates than possible with a single transmit antenna. A repeater supporting MIMO can mediate between the BTS and MS with several different strategies. Again taking only the downlink for the example, the repeater can:

First, as shown and discussed in FIGS. 2 (and 3), the repeater can repeat each MIMO branch independently and without any combining, to the MS. In such scenario, MS will use its combining algorithm to combine the received signal for the best possible SNR. As before, the performance of repeater received signal with low SNR can limit the final performance and the MIMO gain at the MS, as all repeater transmitted signals will combine in air and arrive at all MS antennas.

Figure 4:
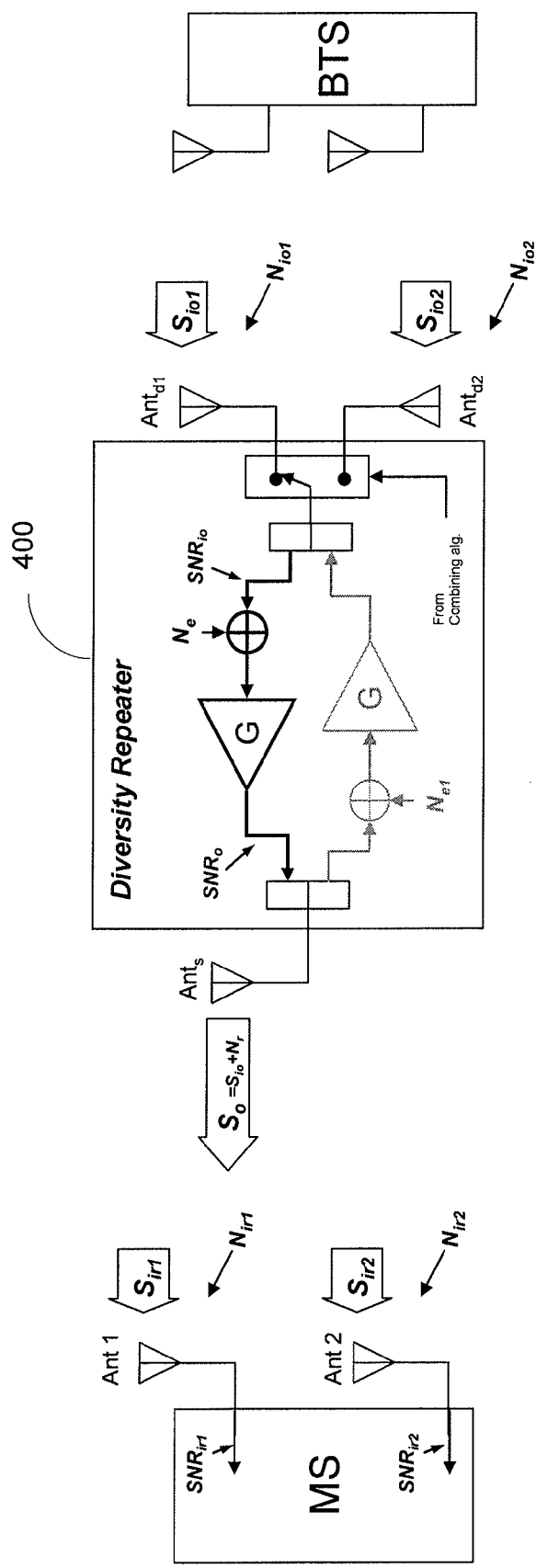
FIG. 4 shows an ASD enabled mobile station with switch and selection diversity repeater.

Second, as shown and discussed in FIG. 4, at the repeater receiver end, it is possible to detect and estimate the RSSI (or channel estimates or SNR for each transmit branch) at each repeater receiver branch, and by selecting a subset of the received signal with the best RSSI (or SNRs) for transmission to the MS, provide a signal with better SNR for the mobile.

Figure 11:
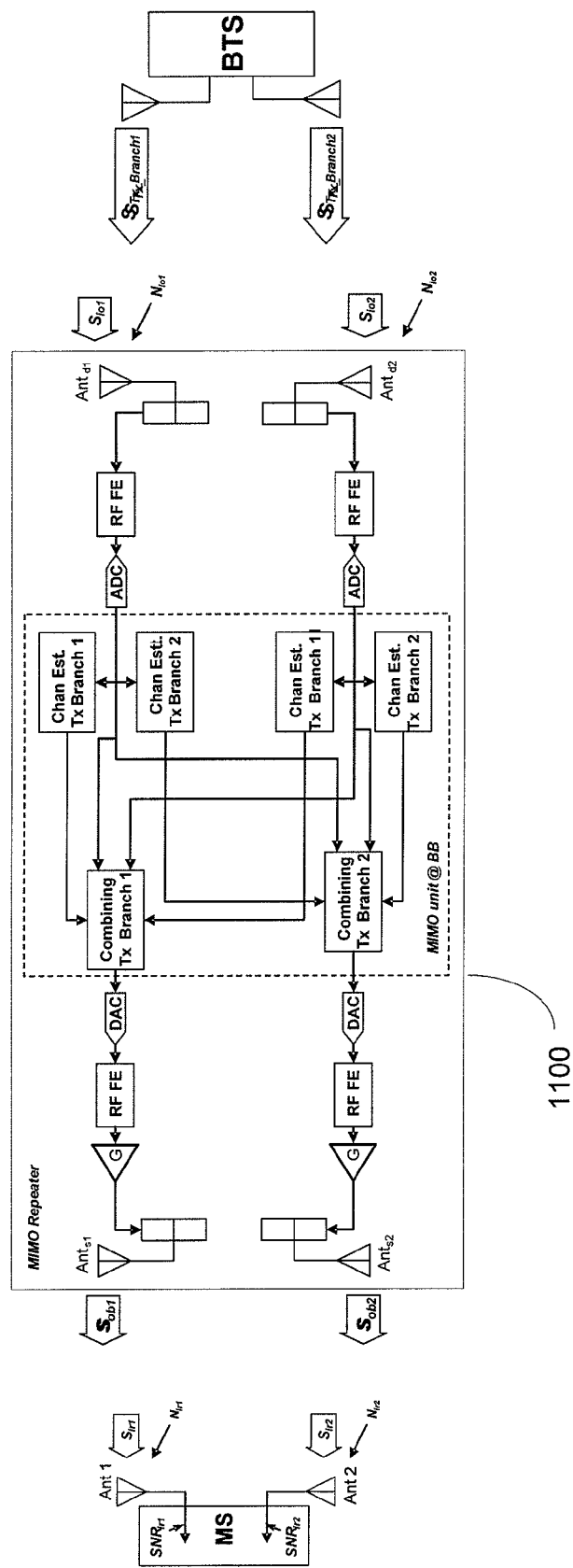
FIG. 11 shows a two-branch MIMO repeater.

Third, FIG. 11 shows the downlink data path and combining blocks 1100 for a two-branch MIMO repeater for a two-branch cellular MIMO system. In this arrangement each BTS transmit branch training sequence is used to do a "channel estimation" for a particular transmit branch signal ($S_{Tx\_Branch}$), at the repeater receiver branch. After obtaining all channel estimations associated with all the transmit branches, the received signal from each receiver branch is "corrected" with the appropriate channel estimation (of the same receiver branch) and combined with the corrected signal from the other receiver branches. This process is repeated for all the transmit branch signals (two in this example). It is also possible to use a subset of the MIMO branches for combining and/or transmission. After the combining process, each receiver branch (two in this example) is then independently amplified and passed through the repeater to the repeater transmitter branches (two in this example).

For a repeater such as the one discussed in patent WO2005025078, care should be taken to measure both receive antenna couplings, and taking the largest coupling (smallest pathloss) for transmit power setting of both transmitter branches. Also, the received power of the coupled transmitted signal is preferably assessed after the combining algorithms to include the combining gain on the coupled signals.

Although a few embodiments have been described in detail above, other modifications are possible. For example, those having the relevant skill in the art will understand that the above novel idea can be applied to all wireless and cellular repeater systems, amongst which GSM/GPRS/EDGE, cdma2000, TD-SCDMA, WCDMA, WiMax can be mentioned. Further, any logic flows described above do not require any particular sequential order to achieve desirable results. Other embodiments may be within the scope of the following claims.

What is claimed:

1. A multiple-input, multiple-output wireless communications three-hop repeater, the repeater comprising a receiver end and a transmitter end with a wireless link between the receiver end and the transmitter end, the receiver end comprising:
   at least a first pair of antennas, each configured to receive transmit branch signals transmitted from each transmit branch of a multiple-output wireless communication device;
   a channel estimator dedicated for each of the transmit branches and connected with each of a number of receiver branch channels, each channel estimator being configured to perform channel estimation on one of the transmit branch signals, the output of each channel estimator for a given transmit branch being used to produce a corrected transmit branch signal associated with a receiver branch channel to produce a corrected transmit branch signal, each corrected transmit branch signal being delayed by a respective time; and
   a combiner associated with each receiver branch channel, to combine the delayed corrected transmit branch signal with other delayed transmit branch signals from other receiver branch channels that have been corrected by their respective channel estimators for the same transmit branch.

2. The repeater in accordance with claim 1, the receiver end further comprising a set of antennas, each configured to transmit a corrected transmit branch signal.

3. The repeater in accordance with claim 1, wherein each of the transmit branch signals includes a unique training sequence for use by each channel estimator to perform channel estimation on the associated transmit branch signal.

4. A method for repeating multiple-input wireless communications on a three-hop repeater, the repeater including a receiver end and a transmitter end with a wireless link between the receiver end and the transmitter end, the method comprising:
   receiving on at least a first pair of antennas a first transmit branch signal and a second transmit branch signal from a multiple-output wireless communication device;
   with a first pair of channel estimators, performing a channel estimation on each of the first transmit branch signal and second transmit branch signal received by a first antenna of the first pair of antennas to produce corrected first and second transmit branch signals, the corrected first and second transmit branch signals each being delayed a respective time;
   with a second pair of channel estimators, performing a channel estimation on each of the first transmit branch signal and second transmit branch signal received by a second antenna of the first pair of antennas to produce corrected first and second transmit branch signals, the corrected first and second transmit branch signals each being delayed a respective time;
   combining the delayed corrected first and second transmit branch signals from the first and second pair of channel estimators to produce a combined signal.

5. The method in accordance with claim 4, further comprising:
   transmitting the first combined signal on a repeater server.

6. A method for repeating multiple-input wireless communications on a three-hop repeater, the repeater including a receiver end and a transmitter end with a wireless link between the receiver end and the transmitter end, the method comprising:

selecting a best transmit signal from a plurality of signals received by multiple antennas of a set of first antennas implemented on a three-hop repeater, each signal of the plurality of signals being associated with a corresponding time delay;

transmitting, on a single antenna, the best transmit signal to a mobile station.

7. A method of improving a base transceiver station signal for repeating to a mobile station, the repeating performed by a three-hop repeater, the repeater including a receiver end and a transmitter end with a wireless link between the receiver end and the transmitter end, the method comprising:

acquiring a selected channel from a number of common channels used by the base transceiver station;

receiving two or more branch signals from the base transceiver station;

estimating a channel impulse response based on the selected channel to produce an estimated channel impulse response for each of the received two or more branch signals; and combining the received two or more branch signals after correcting the received branch signal by a respective conjugate channel impulse response of each receiver branch to produce a common signal for transmission to the mobile station, wherein each corrected branch signal is delayed in time by a respective time delay.

8. The method in accordance with claim 7, wherein the selected channel includes at least one of a pilot, a broadcast, and a control channel.

9. A method of improving a received signal, the method comprising:

acquiring, at a wireless three-hop repeater having at least two receiver diversity and a receiver end and a transmitter end with a wireless link between the receiver end and the transmitter end, the relative phase difference of received branch signals by cross-correlating the received branch signals with each other, each signal of the received branch signals being delayed by a respective time delay;

correcting for the phase difference between the received branch signals; and combining the two or more corrected branch signals to produce a common signal for transmission; and transmitting, by the wireless three-hop repeater, the common signal to a mobile station.

10. The method in accordance with claim 9, further comprising extracting a relative amplitude of the received branch signals and using with the respective relative phases for Maximal Ratio combining of the received branch signals.

11. The method in accordance with claim 10, further comprising transmitting the corrected transmit signal.

12. A method of improving a received signal before repeating the improved signal from a wireless three-hop repeater having at least two receiver diversity, the repeater including a receiver end and a transmitter end with a wireless link between the receiver end and the transmitter end, the method comprising:

receiving signals on at least two branch channels associated with at least two repeater receiver antennas, each signal associated with a corresponding time delay;

determining a signal strength of each of the received signals;

selecting the signal having a higher signal strength; and transmitting the signal having a higher signal strength on at least one server antenna.

13. The method in accordance with claim 12, further comprising:

multiplexing the received signals for transmission to the transmitter end.

14. The method in accordance with claim 13, further comprising:

Demultiplexing, at the transmitter end, the multiplexed signal before transmission on two different transmit antennas.

15. A method of improving a received signal before repeating the improved signal from a wireless three-hop repeater having at least two receiver diversity, the repeater including a receiver end and a transmitter end with a wireless link between the receiver end and the transmitter end, the method comprising:

receiving signals on at least two branch channels associated with at least two repeater receiver antennas implemented on the wireless three-hop repeater;

delaying the signals on each branch channel to produce resolvable path diversity among the at least two branch channels; and linearly combining, at each branch channel and using coefficients determined using an estimator for each branch channel, the signals at a combiner to produce a combined signal.

16. The method in accordance with claim 15, further comprising:

modulating the combined signal to produce a modulated signal for transmission over the wireless link between the receiver end and the transmitter end of the three-hop repeater; and transmitting the modulated signal over the intermediate wireless hop.

17. The method in accordance with claim 16, further comprising:

demodulating the modulated signal to produce a replica of the combined signal.

18. The method in accordance with claim 15, further comprising transmitting the combined signal.

19. The method in accordance with claim 15, wherein the linear combining is based on a maximal-ratio combining algorithm.

20. The method in accordance with claim 15, wherein the linear combining is based on an equal-gain combining algorithm.

* * * * *